W. A. Vertrees,
Harvester Cutter.
No. 27,323
Patented Feb. 26, 1860
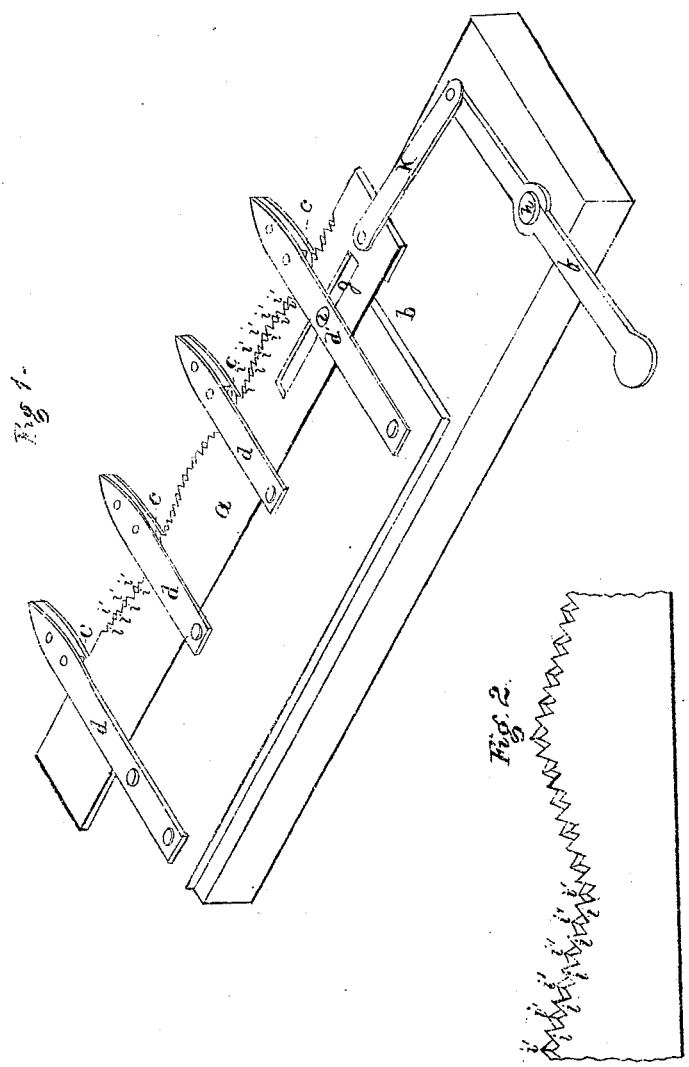
Witness
E. C. Dedman
J. M. Arnold
Signature of Inventor.
W. A. Vertrees

UNITED STATES PATENT OFFICE.

WILLIAM A. VERTREES, OF WINCHESTER, MISSOURI.

IMPROVEMENT IN HARVESTERS.

Specification forming part of Letters Patent No. 27,323, dated February 28, 1860.

*To all whom it may concern:*

Be it known that I, WILLIAM A. VERTREES, of Winchester, in the county of Clark and State of Missouri, have invented a new and useful Improvement in Hemp or Flax Harvesters; and I do hereby declare the following to be a full, clear, and exact description thereof, reference being had to the annexed drawings, forming part of this specification, in which—

Figure 1 is a perspective representation of my improved vibrating cutter for hemp and flax harvesters, placed between slotted fingers on a finger-board. Fig. 2 is a representation of a portion of the blade of my improved cutter, showing the shape of the teeth more clearly.

My improvement consists in the combination of slotted fingers with a cutter having on the same blade a double row of teeth, so situated that the teeth forming the upper row have their cutting edges on the upper side or surface of the blade, while the teeth in the lower row are placed intermediately to the upper teeth, and have their cutting-edges on the lower side or surface of the blade, so that the cutting-edge of the teeth of each row shall be flush with the upper and lower face, respectively, of the slot in which the cutter works, this improvement being designed especially for application to hemp and flax harvesters, but being also applicable with advantage to grain and grass reapers.

In order to enable others skilled in the art to make and use my improvement, I will proceed to describe its construction and operation.

The cutters ordinarily used in machines for reaping hemp and flax are similar in construction to those used in grain-reapers—that is, the beveled edge or face of each of the teeth of the cutter is placed upward, the cutting-edge being turned toward the ground. The result is that in cutting hemp or flax the teeth are apt to get choked and clogged, which materially interferes with the successful operation of the machine. My improvement is designed to remedy this difficulty.

In the drawings, Fig. 1, $a$ is the blade of the cutter, which is in one piece. The cutting-edge projects horizontally beyond the edge of the finger-board $b$, on which it rests and to which it is attached by passing through slots $c\ c$ in the fingers $d\ d$, &c., which are firmly attached to the finger-board $b$, and also by means of a pin, $e$, riveted to one of the fingers $d'$ and to the finger-board below the blade $a$, and which pin $e$ passes through a longitudinal slot or groove, $g$, in the blade, made long enough to permit of the free play or transverse vibration of the blade. A similar pin and slot may be used at intervals throughout the length of the blade, if necessary, to hold it firmly in place. The vibration of the blade $a$ is caused by means of a lever, $f$, having its fulcrum at $h$, and connected with one end of the blade by the rod $k$, or by any other suitable contrivance, operated by the revolution of one of the wheels of the machine in the usual manner. The cutting-edge of the blade $a$ is furnished with small teeth $i\ i'$, &c., of which there are two rows, as seen more clearly in Fig. 2, one row having the cutting-edge of the teeth $i\ i$, &c., in the plane of the upper surface of the blade, and the beveled face of these teeth turned down, while the other row has the cutting-edge of the teeth $i'\ i'$, &c., in the plane of the under surface of the blade, and the beveled face of these teeth turned upward. The upper teeth, $i\ i$, are so placed relatively to the lower teeth, $i'\ i'$, on the blade $a$ that they are intermediate—that is to say, in the succession of teeth the upper teeth, $i$, and under teeth, $i'$, alternate regularly. The teeth are not made of separate pieces or detached from the blade $a$; nor or there two blades, each having one set of teeth; but they are cut in the blade in the manner of a cross-cut-saw, which they resemble somewhat; but the teeth of my cutter are more quartering. The beveled edge of every tooth is the same, and so is the angle of the cutting-edges. The points of the teeth are not arranged in a line parallel to the back edge of the blade $a$, but in short rows, at an acute angle to the back edge of the blade, so as to form indentations in the general contour of the cutting-edge of the blade $a$, as seen in Fig. 2. The effect of this arrangement of the teeth, just described, and placing them in two rows with their cutting-edges in different planes, is that each tooth strikes the stalk of hemp or flax at a different point from that on either side of it, and cuts the stalk a little above or a little below the point where the last tooth passed, so that one tooth serves to free the other, and the cutter is prevented from clogging. The combination of a cutter thus constructed, with the slotted fingers, in the manner described, is also productive of a very important result in preventing the fingers becoming clogged, and enabling the teeth of the cutter to sever any weeds, stalks, fibers, or other substances, which are apt to enter the slots in the fingers on the upper or beveled side of the teeth as ordinarily constructed, for by my construction of cutter there is a cutting-edge on both sides of the cutter, flush with the upper and lower faces of the slots in the fingers, which prevents clogging, and while my improved cutter is peculiarly adapted to cutting hemp or flax, owing to their toughness and fibrous character, yet my improvement is equally adapted, by enlarging the size of the teeth and arranging them as described, to the cutters of grain and grass reapers and mowers.

Having thus described my improvement, what I claim as my invention, and desire to secure by Letters Patent, is—

The combination, with the slotted fingers $dd$, of a cutter having on the same blade a double row of teeth, the upper row having its cutting-edges in the plane of the upper surface of the blade, and the teeth in the lower row having their cutting-edges in the plane of the lower surface of the blade, and being placed intermediate to the teeth in the upper row, as hereinbefore described in the construction of reaping-machines.

In testimony whereof I have hereunto set my hand this 19th day of October, A. D. 1858.

W. A. VERTREES.

Witnesses:
MARTIN G. CUSHING,
AND. MCMASTER.